United States Patent [19]

Merrick

[11] 3,891,508
[45] June 24, 1975

[54] METHOD OF RAPID IDENTIFICATION OF GRAM-NEGATIVE BACTERIA

[76] Inventor: Joseph M. Merrick, 43 Exeter St., Williamsville, N.Y. 14221

[22] Filed: June 1, 1973

[21] Appl. No.: 366,303

[52] U.S. Cl.............................. 195/103.5; 195/96
[51] Int. Cl............................................. C12k 1/04
[58] Field of Search........................... 195/96, 103.5

[56] References Cited
OTHER PUBLICATIONS

Westphal et al., "Bacterial Lipopolysaccharides, Methods of Carbohydrate Chemistry," Vol. V, Academic Press, 1965, pp. 83–91.
Staub, "Polysaccharides of Gram Negative Bacteria, Methods of Carbohydrate Chemistry," Vol. V, Academic Press, 1965, pp. 92–93.
Weckesser et al., "Degradation Analysis of Cell Wall Lipopolysaccharides," J. of Bacteriology, March 1972, pp. 1,106–1,113.
Lehnhardt et al., "Determination of Neutral Sugars in Glycoproteins by Gas-Liquid Chromatography," J. of Chromatography, March 1968, pp. 471–479.

*Primary Examiner*—A. Louis Monacell
*Assistant Examiner*—R. B. Penland
*Attorney, Agent, or Firm*—Abraham A. Saffitz

[57] ABSTRACT

A method of rapid identification of Gram-negative bacteria by the quantitative and qualitative characterization of the sugars in the lipopolysaccharide (LPS) component of the bacterial cell wall. The invention comprises the procedures of bacterial cultivation, harvesting, LPS extraction, purification, and hydrolysis, and characterization of the sugar components of the LPS by chromatographic analysis.

9 Claims, No Drawings

METHOD OF RAPID IDENTIFICATION OF GRAM-NEGATIVE BACTERIA

BACKGROUND AND DISCUSSION OF THE PRIOR ART

The LPS of Gram-negative bacteria consists of a complex heteropolysaccharide chain (called the O-antigen) linked covalently to a lipid fraction (called Lipid A) through an oligosaccharide unit (called the core). Different species of Gram-negative bacteria have different O-antigen structures resulting in variations in their LPS composition.

REFERENCES

The following references are called to the reader's attention:

Adams, G. A., (1970). Can. J. Bioch. 49: 243–250.
Ando, S. and Yamakawa, T., (1971). J. Biochem, 70: 335–340.
Bjorndal, J., Lindberg, B., and Svensson, S., (1967). Acta Chem. Scand. 21: 1,801–1,804.
Chester, I. R., Gray, G. W., and Wilkinson, S. G., (1972). Biochem J. 126: 395–407.
Dijong, I., Mora, P. T., and Brady, R. O., (1971). Biochemistry, 10: 4,041–4,044.
Lehnhardt, W. F., and Winzler, R. J., (1968). J. Chromatog. 34: 471–479.
Leive, L., and Shovlin, V. K., (1968). J. Biol. Chem. 243: 6,384–6,391.
Luderitz, O., Staub, A. M., and Westphal, O., (1966). Bacteriol. Rev. 30: 192–255
Simmons, D. A. R., (1971). Bacteriol Rev. 35: 117–148.
Staub, A. M., Bacterial Lipido-Proteino-polysaccharides in Methods in Carbohydrate Chemistry, Vol. V, ed. R. L. Whistler, pp 92–93, Academic Press, N. Y.
Volk, W. A. (1968). J. Bacteriol. 95: 980–982.
Weckesser, J., Drews, G., and Fromme, I., (1972) J. Bacteriol. 109: 1,106–1,113
Westphal, O., and Jann, K., Bacterial Polysaccharides in Methods in Carbohydrate Chemistry, Vol. V, ed. R. L. Whistler, pp. 83–91, Academic Press, N. Y.
Wilkinson, S. G., (1972). J. Gen. Microb. 70: 365–369.

STATEMENT OF INVENTION

In accordance with the invention the unique LPS of each bacteria provides a "fingerprint" that is easily obtained by the procedures of the invention and is readily identifiable. All unknown fingerprints of Gram-negative bacteria can be stored in a computer. Unknowns fed into the computer can be quickly compared to the knowns and identified. The determination of the bacterial fingerprint and a subsequent identification of the bacteria can be carried out in approximately 24 hours, rather than the 48 to 72 hours now required for the positive identification of bacteria based on fermentation patterns or other metabolic reactions. Hospital utilization of the fingerprint method for diagnosis of disease is very feasible, as many hospitals now have their own computer systems for information storage and analysis.

Constituents of the bacterial cell wall include O-antigens, which are used extensively in the classification of the bacteria Salmonella, Shigella, and Escherichia. The serological specificity of the O-antigens is determined by the heteropolysaccharide side-chains of the LPS in the cell wall. The unique sugar composition of this polysaccharide fraction as well as the remaining monosaccharide components of the LPS constitute the fingerprint and are the basis for rapid identification.

An illustration of the use of LPS fingerprinting is taken with the genus Salmonella. Salmonella has been studied most intensively by bacteriologists and serologists, and about 1,000 species, or chemotypes, are presently known. The separation of one chemotype from another is based on the antigenic specificity of the O-antigens in the cell wall. The LPS from all Salmonella studied contain five common sugars; heptose, 3-keto-3-deoxyoctonia acid, D-glucose, D-glucosamine, and D-galactose. These sugars make up the core of the LPS that is common to all Salmonella. The core is covalently bound to a lipid component. Polysaccharide side-chains are attached to this core and are responsible for the serological specificity of the O-antigens. These antigenic side-chains consist of repeating oligosaccharide units. The sugar components are N-acetylgalactosamine, D-glucose, D-galactose, D-mannose, L-rhamnose, L-fucose, colitose, abequose, paratose, and tyvelose. Salmonella is classified into chemotypes in the basis of the qualitative and quantitative sugar compositions of its LPS side-chains. Fingerprinting of constituent sugars allows for rapid identification of Salmonella chemotypes (see Table I and Table II).

Table 1.

Chemotypes of Salmonella; sugar compositions of LPS.

| chemo-type | D-galac-tosamine | D-glu-cos-amine | 2-keto-3-deoxy-octon-ate | hep-tose | D-gal-ac-tose | D-glucose | D-mannose | L-fuc-ose | L-ham-nose | rib-ose | coli-tose | Abe-guose | Para-tose | Tyve-lose |
|---|---|---|---|---|---|---|---|---|---|---|---|---|---|---|
| I | − | + | + | + | + | + | − | − | − | − | − | − | − | − |
| II | + | + | + | + | + | + | − | − | − | − | − | − | − | − |
| III | − | + | + | + | + | + | + | − | − | − | − | − | − | − |
| IV | + | + | + | + | + | + | + | − | − | − | − | − | − | − |
| V | − | + | + | + | + | + | − | + | + | − | − | − | − | − |
| VI | + | + | + | + | + | + | − | + | − | − | − | − | − | − |
| VII | − | + | + | + | + | + | − | − | + | − | − | − | − | − |
| VIII | + | + | + | + | + | + | − | − | + | − | − | − | − | − |
| XXV | − | + | + | + | + | + | − | − | − | + | − | − | − | − |
| IX | + | + | + | + | + | + | − | − | − | + | − | − | − | − |
| X | − | + | + | + | + | + | − | − | − | − | + | − | − | − |
| XI | + | + | + | + | + | + | − | − | − | − | + | − | − | − |
| XII | + | + | + | + | + | + | + | + | − | − | − | − | − | − |
| XIII | − | + | + | + | + | + | − | − | + | − | − | − | − | − |
| XIV | − | + | + | + | + | + | + | − | + | − | − | + | − | − |
| XV | − | + | + | + | + | + | + | − | + | − | − | − | + | − |
| XVI | − | + | + | + | + | + | + | − | + | − | − | − | − | + |

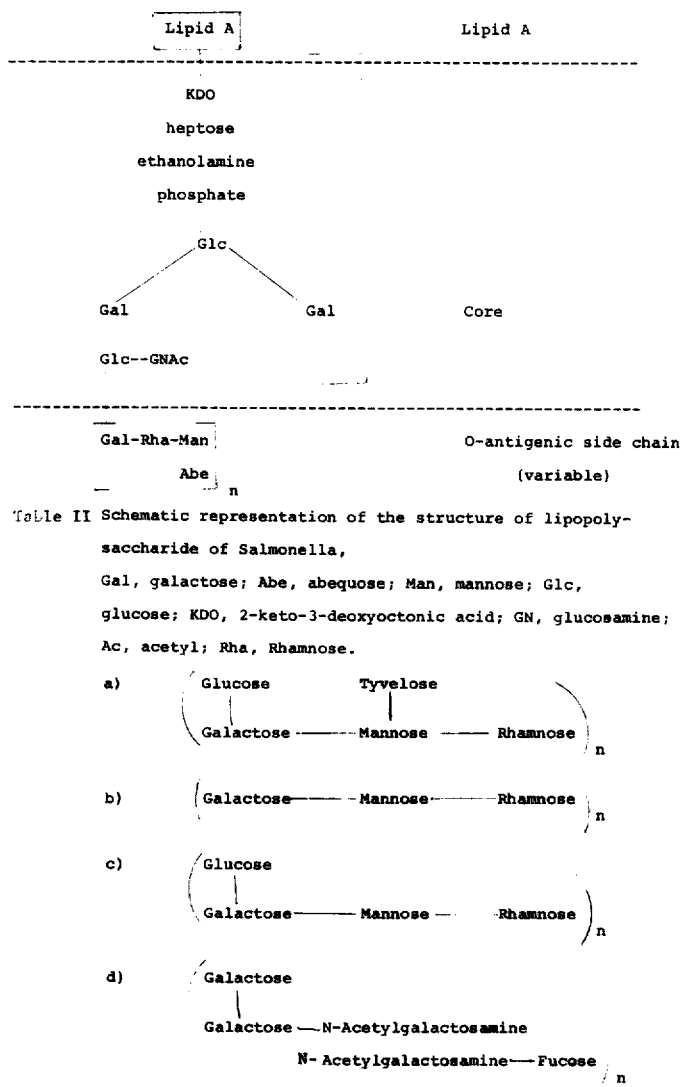

Table II Schematic representation of the structure of lipopolysaccharide of Salmonella, Gal, galactose; Abe, abequose; Man, mannose; Glc, glucose; KDO, 2-keto-3-deoxyoctonic acid; GN, glucosamine; Ac, acetyl; Rha, Rhamnose.

Table III Some repeating units of O-antigenic side chains from Salmonella.

GENERAL PROCEDURE

The following procedure is a general, suggested method for the fingerprint analysis of Gram-negative bacteria. It is not to be construed in a limiting sense.

The procedure can be applied to a sample size of approximately 0.1 mg. (or greater) dry weight of bacterial cells obtained from a single colony or a group of identical colonies. In a Gram-negative bacterial cell, the cell wall can constitute 30 – 40% of the dry cell weight; thus in a 0.1 mg. of cell material, the cell envelope can be of the order of 30–40 μg. LPS can constitute 20 – 30% of the dry weight of the cell wall or 6–12 μg and can thus provide a sufficient amount of material for sugar analysis by gas chromatographic procedures. If less than 0.1 mg. of material is available, colonies after primary isolation are transferred to an appropriate liquid broth medium and aerated for 2–4 hours to allow increase in cell numbers.

The bacteria are inoculated onto appropriate plates for primary isolation of individual bacterial colonies. Colonies are transferred to centrifuge tubes and washed with water and acetone and extracted for LPS. If necessary to increase mass, colonies are transferred to centrifuge tubes' containing appropriate broth medium, aerated for 2–4 hours, and then centrifuged and washed with water and acetone.

LPS is extracted from the bacteria by one of the following extraction procedures.
1. phenol - water
2. trichloracetic acid
3. acetic acid
4. ethylenediamine tetracetate (EDTA).

The above procedures are known from the present references. The isolated LPS is acid hydrolyzed to its sugar components. The sugar components are converted to either trifluoroacetyl derivatives, trimethylsilyl derivatives or alditol acetates. Accurate qualitative or quantitative determinations of the sugar components are obtained by performing gas chromatography of the derivatives on suitable columns in known manner.

The general method described above is applicable to the following genera of bacteria (each of these groups contain known pathogens to man and to other animals).

1. Enterics (e.g. Escherichia, Salmonella, Shigella, Proteus, Aerobacter, Klebsiella).
2. Pseudomonas
3. Vibrio
4. Hemophilus
5. Bordetella
6. Pasteurella
7. Brucella
8. Neisseria

EXAMPLES

The following examples offer a more complete understanding of the invention, and show a method for the rapid identification of Gram-negative bacteria based on a determination of the quantitative and qualitative composition of lipopolysaccharide, a readily removable, surface structure component of Gram-negative bacteria. The principle is based on differences in lipopolysaccaride structure of different species of Gram-negative bacteria. This component, therefore is specific and will signify each bacterial species; even strains within a species.

EXAMPLE 1

Enteric Bacilli

Most of the important pathogens of this group belong to the genera Salmonella (e.g. *Salmonella typhosa*, the causative agent of typhoid fever) and Shigella (e.g., *Shigella dysenteriae*, the causative agent of bacillary dysentery). Other organisms in this group are not usually pathogens except under special conditions and include organisms belonging to the genera, Escherichia, Proteus, Aerobacter, and Klebsiella.

The potential utility of the described method is best illustrated by examining Table 1 which gives the sugar components in the LPS of various chemotypes of Salmonella. It is apparent that fingerprints, based on sugar composition alone, will differentiate the various chemotypes of Salmonella. While available evidence in the scientific literature suggests differences in LPS between different genera, the method of the invention is capable of distinguishing these groups (genera) from one another.

For primary isolation, suspected enteric organisms are inoculated onto suitable agar plates such as EMB agar, Endo Agar, MacConkey Agar or other similar media. Suitable selective media for the isolation of Salmonella and Shigella include Desoxycholate Citrate Lactose Sucrose Agar, Desoxycholate Agar, Desoxycholate Citrate Agar, Desoxycholate Lactose Agar or other similar media. After incubation of plates (18–24 hours at 35°–37°C) a single colony or several identical colonies are removed from the plate by a spatula and transferred to a centrifuge tube (15.0 ml. is a suitable size) and washed with water or saline two (2) times, five (5.0) ml. each time, followed by two (2) five (5.0) ml. washes with acetone. The cells can be extracted for LPS directly or air dried and stored for later work up. The dry weight of cells should exceed 0.1 mg. If a sufficient sample size cannot be obtained from a single or several colonies, it is necessary to grow the cells for a short period of time to obtain an increase in mass. Under these conditions a colony (or colonies) is transferred to a centrifuge tube (50.0)ml. size is sufficient) containing 25.0 ml. of an appropriate medium which permits rapid growth. Liquid broth (LB) medium is suitable for these purposes (LB medium contains in grams per liter the following components: Bacto tryptone, 10.0; Bacto yeast extract, 5.0; NaCl, 10.0 and glucose, 2.0. The pH is adjusted to 7.0 with NaOH). Also Trypticase Soy Broth may be used. After inoculation, the incubations are carried out at 37°C and with rapid aeration. After 2–4 hours the bacterial cells are centrifuged and washed with water or saline and acetone as described previously. The cells are air dried for later work up or extracted for LPS directly.

LPS EXTRACTION PROCEDURE

The cells can be extracted for LPS by one of the following methods:

a. phenol-water The cells are extracted twice with a mixture of phenol and water (45:55). Extraction is carried out at 65°–68° and the water layers of the two extractions combined and extracted two times with diethyl ether to remove phenol. The water layer is evaporated in vacuo to 1.0 ml and treated with cetyltrimethylammonium bromide to remove contaminating acid polysaccarides. Any precipitate formed is removed by centrifugation and the supernatant fluid is dried in vacuo.

b. trichloroacetic extraction Cells are extracted with 0.25N trichloroacetic acid at 4°. Trichloroacetic acid is removed by ether extraction and further treated as in (a).

c. acetic acid extraction Cells are heated with 0.1N acetic acid at 90° for 1.5 hours. After cooling, the precipitate is removed by centrifugation and the supernatant extracted with ether and further treated as in (a).

d. ethylenediamine tetraacetate (EDTA) extraction For this procedure the acetone wash of harvested cells is omitted. Water or saline washed cells are suspended in 2.0 ml. of 0.12 M tris(hydroxymethyl)aminomethane-hydrochloride pH 8.0 made 0.01M with EDTA. After 4 minutes at 37°, the cells are centrifuged and the supernatant fluid is dried in vacuo.

For gas chromatography, LPS is hydrolyzed in methanolic hydrogen chloride. After methanolysis the fatty acid methy esters are extracted with n-hexane. The methanol layer is dried in vacuo, the residue dissolved in an appropriate solvent (e.g. ethy acetate) and trifluoro-acetylated with trifluoroacetic acid. The trifluoroacetyl derivatives of the LPS sugars are chromatographed in a suitable commercial gas chromatograph equipped with a suitable column (e.g., chromatography on a mixed coated column of SE-30 and XG-60 is appropriate) to yield a fingerprint of the sugar components.

Alternative procedures to the above include the following:

i. After methanolysis and extraction of fatty acid methyl esters as above, the methanol layer is dried in vacuo and the residue dissolved in dry pyridine-hexamethyl disilazenetrimethylchlorosilane (5:1:1, v/v/v) to form the trimethylsilyl derivatives. The trimethylsilyl derivatives are injected into a suitable gas chromatograph with a suitable column (e.g., chromatography on column packed with 2.5% silicone rubber SE-30 on Chromosorb W, 100–120 mesh is appropriate).

ii. After methanolysis and extraction of fatty acid methyl esters as above, the methylated sugars are treated with Dowex 50(H$^+$), evaporated to dryness and converted to alditol acetates. In this procedure sugars are reduced with sodium borohydride. The methylated alditols are then acetylated with acetic anhydride and the alditol acetates of the methylated sugars are analyzed by gas chromatography in a suitable gas chromatograph equipped with a suitable column (e.g., chromatography on a column of 3% ECNSS - M on Gas Chrom Q (100 to 120 mesh) or on a column containing 0.75% HiEFF - 1 BP, 0.25% EGSS-X and 0.1% 144-B (phenyl-diethanolamine) on 60/80 Gas Chromosorb Q are appropriate).

Current Procedures

Current procedures utilize classical diagnostic methods and are usually dependent on the use of selective and differential media. Identification is usually based on different types of metabolic by-products which result in chemical changes in the medium. Final identification of an individual species may also require serological studies and is based on specific differences in antigenic structure. The disadvantage of these procedures is the length of time required for positive identification, usually a period of several days.

The present rapid identification method of this first Example utilizes the gas chromatograph for determination of the characteristic fingerprint as a result of analyses of the lipopolysaccharide components. The procedure differs from previous unsuccessful approaches in the use of gas chromatography for identification of bacteria. These earlier approaches were based on identification of by-products formed in the culture medium as a result of bacterial growth or on the pyrolysis of bacteria. These approaches are inherently difficult because of the quantitative and qualitative variability of bacterial by-products in the former case and the lack of specificity in the latter case.

Lipopolysaccharides are specific for the bacterium under specified conditions, easily removable, hydrolyzable and readily analyzable by gas chromatographic methods. As illustrated hereinabove, it therefore, provides a suitable label for signifying the bacterium.

EXAMPLE 2

Neisseriae

Primary isolation medium from clinical material may be carried out on the following or other suitable medium: blood or chocolate agar; Thioglycollate Medium-135C; GC Agar; Thayer-Martin Selective Agar; Trypticase Soy Agar. Cultivation is carried out at 35° in the presence of 95% Air - 5% $CO_2$. Colony or colonies are extracted for LPS directly as in Example 1, if sufficient material is available. If insufficient sample size cannot be obtained, a colony (or colonies) are transferred to a centrifuge tube (50.0 ml. size) containing 25.0 ml. of an appropriate medium which permits rapid growth. Trypticase Soy Broth is suitable for this purpose. After inoculation aeration is carried out at 35° (using a 95% air - 5% $CO_2$ mixture). After 2-4 hours the bacterial cells are centrifuged and washed with water or saline and acetone as described in Example 1. All other procedures are described in Example 1.

EXAMPLE 3

Pseudomonas

The procedures described under Example 1 also apply with organisms of this genus.

EXAMPLE 4

Vibrio

Primary isolation medium such as TCBS Agar is suitable. Following isolation, the procedures described under Example 1 also apply with organisms of this genus.

EXAMPLE 5

Hemophilus

Primary isolation can be carried out with chocolate agar; Trypticase Soy Blood Agar with Yeast Hemin Extract; Incubate in 5% $CO_2$ atmosphere. For increase in cell number, colonies removed from the chocolate agar are transferred to trypticase Soy Broth supplemented with Yeast Hemin Extract. All other procedures are carried out as described in Example 1.

EXAMPLE 6

Bordetella

Primary isolation is carried out with Bordet Gengou Agar supplemented with glycerol and blood. For increase in cell numbers, colonies are removed from agar and transferred to a blood broth supplemented with glycerol and potato extract. All other procedures are carried out as described in Example 1.

EXAMPLE 7

Pasteurella

Primary isolation can be carried out on chocolate agar; Trypticase Soy Blood Plate; Trypticase Soy Agar, TCBS Agar; Thioglycollate Medium - 135°C. For increase in cell numbers, colonies are removed from the agar and transferred to Trypticase Soy Broth. All other procedures are carried out as described in Example 1.

EXAMPLE 8

Brucella

Primary isolation can be carried out in Trypticase Soy Blood (or plain) Agar. For increase in cell numbers, colonies are removed from the agar and transferred to Trypticase Soy Broth. All other procedures are carried out as described in Example 1.

Having thus disclosed the invention, I claim:

1. A method of rapid identification of Gram-negative bacteria comprising:
   culturing unknown bacteria on a nutrient medium:
   harvesting by centrifugation;
   sampling 0.1 mg as a minimum bacterial sample size;
   extracting and isolating lipopoly saccharides (LPS) from the bacteria;
   hydrolyzing of LPS into monosaccharide constituents; and
   determining the sugar composition of the polysaccharide fraction by gas-liquid chromatographic procedures and comparing the sugar composition of the unknown bacterial LPS with those of known bacteria for identification.

2. The method as set forth in claim 1, wherein the extraction is made with phenol and water mixture.

3. The method as set forth in claim 1, wherein LPS extraction is made with trichloroacetic acid.

4. The method as set forth in claim 1, wherein LPS extraction is made with acetic acid.

5. The method as set forth in claim 1, wherein LPS extraction is made with ethylenediamine tetracetate.

6. The method as set forth in claim 1, wherein fatty acid methyl esters are extracted after methanolysis of LPS.

7. The method as set forth in claim 1, wherein the sugar component is converted to trifluoroacetyl derivatives.

8. The method as set forth in claim 1, wherein the sugar component is converted to trimethylsilyl derivatives.

9. The method as set forth in claim 1, wherein the sugar component is converted to alditol acetates.

* * * * *